US012714114B2

(12) United States Patent
Hillitzer et al.

(10) Patent No.: US 12,714,114 B2
(45) Date of Patent: Aug. 25, 2026

(54) WHIPPING AGENT FOR BAKED GOODS

(71) Applicant: Louis Dreyfus Company Ingredients GmbH, Illertissen (DE)

(72) Inventors: Gerald Hillitzer, Ludwigshafen am Rhein (DE); Jochen Kutscher, Ludwigshafen am Rhein (DE); Thrandur Helgason, Ludwigshafen am Rhein (DE); Selina Marz, Ludwigshafen am Rhein (DE)

(73) Assignee: Louis Dreyfus Company Ingredients GmbH, Illertissen (DE)

( * ) Notice: Subject to any disclaimer, the term of this patent is extended or adjusted under 35 U.S.C. 154(b) by 1011 days.

(21) Appl. No.: 17/603,654

(22) PCT Filed: Apr. 15, 2020

(86) PCT No.: PCT/EP2020/060596
§ 371 (c)(1),
(2) Date: Oct. 14, 2021

(87) PCT Pub. No.: WO2020/212425
PCT Pub. Date: Oct. 22, 2020

(65) Prior Publication Data

US 2022/0232838 A1 Jul. 28, 2022

(30) Foreign Application Priority Data

Apr. 15, 2019 (EP) .................................... 19169153

(51) Int. Cl.
*A21D 10/00* (2006.01)
*A21D 2/14* (2006.01)
*A21D 2/26* (2006.01)

(52) U.S. Cl.
CPC .......... *A21D 10/005* (2013.01); *A21D 2/145* (2013.01); *A21D 2/268* (2013.01)

(58) Field of Classification Search
CPC ..................................................... A21D 2/268
See application file for complete search history.

(56) References Cited

U.S. PATENT DOCUMENTS 2,958,630 A 11/1960 Himes et al.
3,653,917 A 4/1972 Wahba et al.
(Continued)

FOREIGN PATENT DOCUMENTS

EP 0362181 A2 4/1990
EP 0588496 A1 3/1994
(Continued)

OTHER PUBLICATIONS

Mulcahy et al., "Improvement of the functional properties of whey protein hydrolysate by conjugation with maltodextrin", International Dairy Journal, vol. 60, Sep. 2016, pp. 47-54, (Year: 2016).*
(Continued)

*Primary Examiner* — Elizabeth Gwartney
(74) *Attorney, Agent, or Firm* — Eversheds-Sutherland (US) LLP

(57) ABSTRACT

The presently claimed invention provides a use of a composition comprising protein hydrolysate or protein hydrolysate conjugate and at least one acid as whipping agent. The invention further relates to a method for aerating a carbohydrate containing food product by adding one protein hydrolysate or at least one protein hydrolysate conjugate and at least one acid and its salts thereof. The invention also relates to the process of preparing a composition comprising at least one protein hydrolysate conjugate and at least one acid and its salts thereof.

16 Claims, 3 Drawing Sheets

(56) References Cited

U.S. PATENT DOCUMENTS

| | | | |
|---|---|---|---|
| 3,666,493 A | 5/1972 | Bluemke | |
| 3,814,816 A | 6/1974 | Gunther | |
| 4,980,450 A | 12/1990 | Brule et al. | |
| 7,250,187 B2 | 7/2007 | Domingues | |
| 2003/0175407 A1 | 9/2003 | Kunst et al. | |
| 2009/0196973 A1 | 8/2009 | Piatko et al. | |
| 2009/0311407 A1* | 12/2009 | Lucey | A23L 29/10 426/573 |
| 2013/0059928 A1 | 3/2013 | Dhalleine et al. | |
| 2017/0049141 A1* | 2/2017 | Lucey | A61K 35/20 |
| 2020/0305445 A1 | 10/2020 | Helgason et al. | |

FOREIGN PATENT DOCUMENTS

| | | |
|---|---|---|
| EP | 1327390 A1 | 7/2003 |
| JP | 2000-210030 A | 8/2000 |
| JP | 2002-354980 A | 12/2002 |
| JP | 2003-333997 A | 11/2003 |
| WO | 93/08702 A1 | 5/1993 |
| WO | 1998/043498 A1 | 10/1998 |
| WO | 99/46036 A1 | 9/1999 |
| WO | 2009/053852 A2 | 4/2009 |
| WO | 2019/081706 A1 | 5/2019 |

OTHER PUBLICATIONS

International Search Report and Written Opinion received for PCT Patent Application No. PCT/EP2020/060596, mailed on Jul. 10, 2020, '15 pages.

European Search Report for EP Patent Application No. 19169153.4, Issued on Sep. 18, 2019, 4 pages.

Frister, et al., "OPA method modified by use of N,N-dimethyl-2-mercaptoethylammonium chloride as thiol component", Fresenius' Zeitschrift fur analytische Chemie vol. vol. 330, Issue 7, Jan. 1988, pp. 631-633.

International Preliminary Report on Patentability received for PCT Patent Application No. PCT/EP2020/060596, mailed on Oct. 28, 2021, 13 pages.

Morrison, et al., "Selective extraction and quantitative analysis of non-starch and starch lipids from wheat flour", Journal of the Science and Food of Agriculture, vol. 26, Issue 4, Apr. 1975, pp. 507-521.

* cited by examiner s

WHIPPING AGENT FOR BAKED GOODS

CROSS-REFERENCE TO RELATED APPLICATIONS

This application is a national stage application (under 35 U.S.C. § 371) of PCT/EP2020/060596, filed Apr. 15, 2020, which claims benefit of European Application No. 19169153.4, filed Apr. 15, 2019, both of which are incorporated herein by reference in their entirety.

FIELD OF THE INVENTION

The presently claimed invention relates to the use of a composition comprising protein hydrolysate or protein hydrolysate conjugate and at least one acid as whipping agent. The invention further relates to a method for aerating a carbohydrate containing food product by adding protein hydrolysate or protein hydrolysate conjugate and at least one acid and its salts thereof. The invention also relates to the process of preparing a composition comprising at least one protein hydrolysate conjugate and at least one acid and its salts thereof.

BACKGROUND OF THE INVENTION

During the preparation of all bakery products a leavening agent or system to is required to impart a light and soft crumb structure to the bakery products. In the 19$^{th}$ century baking powder was developed. Baking powder acts much faster and is easy to store and handle due to its powdery consistency. Baking powders develop carbon dioxide by reaction of a carbon dioxide source with an acidifier.

Today, baking powders comprise sodium bicarbonate or, less frequently, potassium bicarbonate, as the carbon dioxide source, and tartaric acid, sodium acid pyrophosphate, or monocalcium phosphate and sodium aluminum sulfate as acidifier. When phosphate free compositions are desired glucono delta lactone and calcium citrate arere also used as acidifier.

Current industrial scale baking uses emulsifiers which help to generate foam much faster and secondly stabilize the foam during whipping and baking (Bennion & Bemford, 1997). Furthermore, by using emulsifiers, it is possible to whip the whole recipe (i.e. egg white, egg yolk, sugar, starch, wheat flour and baking powder) without side effects. However, such emulsifiers are used in combination with baking powder.

EP 0,362,181 A2 describes a sodium free baking powder containing a combination of stabilized, X-ray amorphous calcium carbonate and a leavening acid. As leavening acids, sodium acid pyrophosphate, sodium aluminum sulfate, monocalcium phosphate, dicalcium phosphate, sodium aluminum phosphate, fumaric acid and citric acid are disclosed.

EP 0,588,496 A1 relates to the addition of citric acid combined with at least one of calcium hydroxide, calcium oxide and calcium carbonate to yeast raised doughs intended for microwave ovens.

U.S. Pat. No. 7,250,187 B2 describes the mixing of encapsulated chemical leavening agents into a dough with reduced shear to protect the encapsulation by a degradable barrier material applied to control the reaction of the leavening agent until a time during baking.

Nowadays, the baking industry is interested to extend the volume of a cake based on the same amount of batter or to reduce the amount of ingredients and therefore costs to produce the same volume of cake without reducing cake quality. Further, consumer trends for more natural products and lower number of ingredients on the product label creates a demand for an alternative to chemical baking powder and synthetic emulsifiers such as mono- and diglycerides of fatty acids and synthetic fatty acid esters.

Additionally, for quite a long time now, sodium in food has been a concern. It is believed that an excessive sodium intake provokes or aggravates high blood pressure. Therefore, efforts are undertaken to replace sodium. While replacing sodium bicarbonate with potassium bicarbonate is not problematic for baking powders, the acidifier is more critical. Many batters react sensitively to an exchange of sodium acid pyrophosphate by other acidifiers, especially industrial batters.

Thus, the prior art does not provide a suitable whipping/aerating agent for industrial use that has the same leavening effect as the most commonly used whipping/aerating agents, such as emulsifiers, and good storage stability.

Therefore, the object remains to provide an aerating or whipping agent which is free of baking powder and chemical emulsifiers and yet allows to generate a fine foam and to stabilize foam under stressful environments such as baking.

SUMMARY OF THE INVENTION

It has surprisingly been found in the context of the presently claimed invention and as shown and exemplified herein, that the use of the protein hydrolysate or protein hydrolysate conjugate and an acid, such as lactic acid, in baked goods results in superior cake volume and elasticity compared to baking powder and chemical emulsifiers. The use of the protein hydrolysate or protein hydrolysate conjugate and an acid obviates the use of baking powder and chemical emulsifiers and yet results in the same preferred even cake crumb structure.

Thus, in one aspect, the presently claimed invention provides a use of a composition comprising a) at least one protein hydrolysate or at least one protein hydrolysate conjugate; and b) at least one acid and its salts thereof;

as whipping agent.

In another aspect, the presently claimed invention provides a use of a composition comprising a) at least one protein hydrolysate or at least one protein hydrolysate conjugate; and b) at least one acid and its salts thereof;

wherein the at least one protein hydrolysate conjugate is obtained by amino-carbonyl bonding of an at least one protein hydrolysate with a weight average molecular weight ($M_W$) in the range of ≥600 to ≤2400 Da and at least one sugar having a weight molecular weight ($M_W$) in the range of ≥100 to ≤20000 Da;

as whipping agent.

In another aspect, the presently claimed invention provides a method for aerating a carbohydrate containing food product comprising the step of adding at least one composition comprising at least one protein hydrolysate or at least one protein hydrolysate conjugate and at least one acid and its salts thereof to the carbohydrate containing food product prior to aerating.

In yet another aspect, the presently claimed invention relates to a composition comprising A) at least one protein hydrolysate conjugate; and B) at least one acid and its salts thereof.

BRIEF DESCRIPTION OF THE DRAWINGS

The detailed description is set forth with reference to the accompanying drawings.

Figure 1:
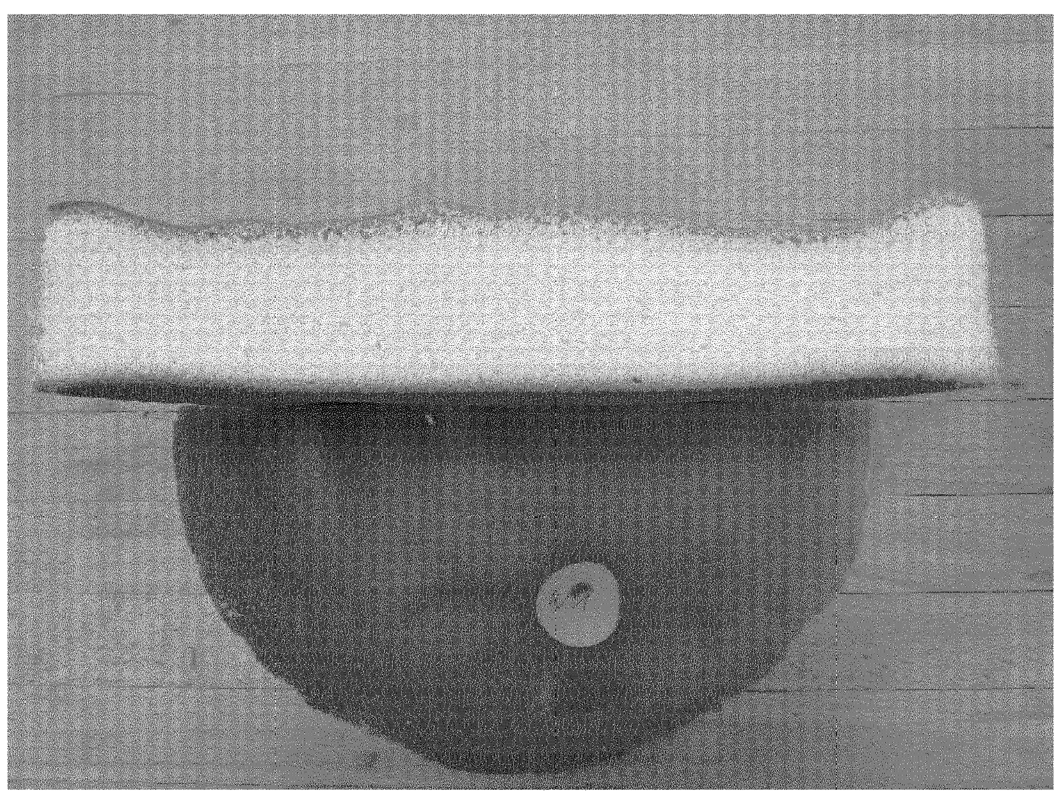
FIG. 1 shows a cake make with recipe 1, for comparative purposes. This cake was not made with the improved whipping agent described herein, and is shown for comparative purposes.

The present disclosure will now provide a more detailed and specific description that will refer to the accompanying drawings.

DETAILED DESCRIPTION OF THE INVENTION

The following detailed description is merely exemplary in nature and is not intended to limit the presently claimed invention or the application and uses of the presently claimed invention. Furthermore, there is no intention to be bound by any theory presented in the preceding technical field, background, summary or the following detailed description.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

Furthermore, the terms "(a)", "(b)", "(c)", "(d)" etc. and the like in the description and in the claims, are used for distinguishing between similar elements and not necessarily for describing a sequential or chronological order. It is to be understood that the terms so used are interchangeable under appropriate circumstances and that the embodiments of the subject matter described herein are capable of operation in other sequences than described or illustrated herein. In case the terms "(A)", "(B)" and "(C)" or AA), BB) and CC) or "(a)", "(b)", "(c)", "(d)", "(i)", "(ii)" etc. relate to steps of a method or use or assay there is no time or time interval coherence between the steps, that is, the steps may be carried out simultaneously or there may be time intervals of seconds, minutes, hours, days, weeks, months or even years between such steps, unless otherwise indicated in the application as set forth herein above or below.

In the following passages, different aspects of the subject matter are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" or "preferred embodiment" means that a particular feature, structure or characteristic described in connection with the embodiment is included in at least one embodiment of the presently claimed invention. Thus, appearances of the phrases "in one embodiment" or "In a preferred embodiment" or "in a preferred embodiment" in various places throughout this specification are not necessarily all referring to the same embodiment but may refer. Furthermore, the features, structures or characteristics may be combined in any suitable manner, as would be apparent to a person skilled in the art from this disclosure, in one or more embodiments. Furthermore, while some embodiments described herein include some, but not other features included in other embodiments, combinations of features of different embodiments are meant to be within the scope of the subject matter, and form different embodiments, as would be understood by those in the art. For example, in the appended claims, any of the claimed embodiments are used in any combination.

Furthermore, the ranges defined throughout the specification include the end values as well, i.e. a range of 1 to 10 implies that both 1 and 10 are included in the range. For the avoidance of doubt, the applicant shall be entitled to any equivalents according to applicable law.

The baked goods according to the presently claimed invention are products, wherein the lifting of the batter is preferably performed without the presence of yeast or sour dough or any baking powder, but is basically done by mechanically aerating the batter. In other words, the composition that is described herein is preferably free of any baking powder. Baking powder is a powder used as a leavening agent in making baked goods that typically consists of sodium bicarbonate or potassium bicarbonate. Hence, in a preferred embodiment, the compositions that are described herein are free of sodium bicarbonate and potassium bicarbonate.

Preferred baked goods are cakes like sponge cake, swiss rolls or angel cakes.

In an embodiment, the presently claimed invention provides a use of a composition comprising a) at least one protein hydrolysate or at least one protein hydrolysate conjugate; and b) at least one acid and its salts thereof;

as whipping agent.

In yet another aspect, the presently claimed invention provides a use of a composition comprising a) at least one protein hydrolysate or at least one protein hydrolysate conjugate; and b) at least one acid and its salts thereof;

wherein the at least one protein hydrolysate conjugate is obtained by amino-carbonyl bonding of an at least one protein hydrolysate with a weight average molecular weight ($M_W$) in the range of ≥600 to ≤2400 Da and at least one sugar having a weight average molecular weight ($M_W$) in the range of ≥100 to ≤20000 Da;

as whipping agent.

In yet another aspect, the presently claimed invention provides a use of a composition comprising a) at least one protein hydrolysate or at least one protein hydrolysate conjugate; and b) at least one acid and its salts thereof;

wherein the at least one protein hydrolysate conjugate is obtained by amino-carbonyl bonding of an at least one protein hydrolysate with a weight average molecular weight ($M_W$) in the range of ≥750 to ≤1800 Da and at least one sugar having a weight average molecular weight ($M_W$) in the range of ≥100 to ≤1000 Da;

as whipping agent.

In another aspect, the presently claimed invention provides a method for aerating a carbohydrate containing food product comprising the step of adding at least one composition comprising at least one protein hydrolysate or at least one protein hydrolysate conjugate and at least one acid and its salts thereof to the carbohydrate containing food product prior to aerating.

In another aspect, the presently claimed invention relates to a composition comprising A) at least one protein hydrolysate conjugate; and B) at least one acid and its salts thereof.

In a preferred embodiment, the at least one acid is selected from the group consisting of lactic acid, phosphoric acid, hydrochloric acid, citric acid, ascorbic acid, tartaric acid and sulfuric acid. In a more preferred embodiment, the at least one acid is lactic acid.

Protein Hydrolysate

Protein hydrolysate is defined as a mixture of amino acids prepared by splitting at least one protein with enzyme or by chemical treatment.

In a preferred embodiment, the at least one protein hydrolysate is a plant or animal protein hydrolysate. The at least one protein is selected from the group consisting of wheat, soy, rice, potato, pea, sunflower, rape seed, lupin and milk protein hydrolysate. The at least one milk protein is selected from the group consisting of casein, whey protein and beta-lactoglobulin hydrolysate. In a more preferred embodiment at least one protein is selected from the group consisting of wheat hydrolysate and casein hydrolysate; more preferably casein hydrolysate.

Each protein has a different weight average molecular weight ($M_w$), and structure and therefore the optimal range of different protein hydrolysates depend of the individual protein.

In a preferred embodiment, the at least one protein hydrolysate is an enzymatically hydrolysed protein hydrolysate. In yet another preferred embodiment, the enzymes are endopeptidases. The examples of endopeptidases enzymes are Alkalase and Neutrase.

In yet another preferred embodiment, the at least one protein hydrolysate is a chemically hydrolysed protein hydrolysate. The chemically hydrolysed protein hydrolysate is obtained by hydrolysis of a protein by an acid or an alkali hydroxide. In a preferred embodiment, the alkali hydroxide is selected from the group consisting of sodium hydroxide and potassium hydroxide. In a preferred embodiment, the acid is selected from the group consisting of hydrochloric acid, sulfuric acid and phosphoric acid. The conditions and the process must be carefully controlled to obtain a protein hydrolysate in the desired $M_W$ range.

In a preferred embodiment, the at least one protein hydrolysate is unfiltered after hydrolysis. It is also possible to add a filtering step, when solubility after hydrolysis is too low, and needs to be increased to obtain a higher solubility, a lower batter density, a higher elasticity and a higher cake volume.

In another embodiment, the at least one protein hydrolysate is neutralized to about pH 7.0 after hydrolysis by application of any acid suitable for food ingredients. The acid suitable for food ingredients is selected from the group consisting of lactic acid, phosphoric acid, hydrochloric acid, citric acid and sulfuric acid. This pH neutral protein hydrolysate is spray dried. The spray dried product has advantages depending on the other batter ingredients.

In a preferred embodiment, the maximum weight average molecular weight ($M_W$) of the protein hydrolysate is 2300 Da; more preferably 2200; yet more preferably 2100; most preferably 2000; particularly 1800 or 1700 Da. The lower the weight average molecular weight is, the finer the resulting cake structure after baking will be with respect to the air pockets in the cake. But a too small $M_W$ results in a loss of stability during whipping or baking, and the batter will have a higher density, or the batter will collapse during baking. Therefore, in a preferred embodiment, the minimum weight average molecular weight ($M_W$) of the protein hydrolysate is 600 or 650 Da, more preferably 660; yet more preferably 670; most preferably 680; particularly 750 or 800 Da.

In a preferred embodiment, the weight average molecular weight ($M_W$) of a casein hydrolysate is between 600 or 650 and 1000 Da, more preferably between 600 or 670 and 900 Da or 690 and 900 Da; particularly between 680 and 870 Da or 720 and 870 Da.

Protein Hydrolysate Conjugate

In a preferred embodiment, the at least one protein hydrolysate conjugate is obtained by amino-carbonyl bonding of at least one protein hydrolysate with a weight average molecular weight ($M_W$) in the range of ≥600 to ≤2400 Da and an at least one sugar having a weight average molecular weight ($M_W$) in the range of ≥100 to ≤20000 Da. In yet another preferred embodiment, the amino-carbonyl bonding is performed at a temperature in the range of ≥40° C. to ≤75° C.

In a preferred embodiment, the at least one protein hydrolysate conjugate is casein hydrolysate conjugate or wheat hydrolysate conjugate. For casein hydrolysate conjugate the $M_W$ of the hydrolysate is preferably between 700 and 1000 Da, more preferably between 720 or 750 and 900 Da. For wheat hydrolysate conjugate, the $M_W$ of the hydrolysate is preferably between 1300 and 2200 Da, more preferably between 1500 and 2000 Da.

Molecular Weight ($M_W$) Determination of Protein Hydrolysate:

In a preferred embodiment, the weight average molecular weight of the at least one protein hydrolysate and the at least one protein hydrolysate conjugate is determined by measuring OPA-N according to Frister H., Meisel H., Schlimme E. (1988) OPA method modified by use of N,N-dimethyl-2-mercaptoethylammonium chloride as thiol component. Anal. Chem. V 330, pp 631-633) and Total N according to Dumas method 1826 and calculating of the weight average molecular weight by the following formula:

$$(\text{Total } N/\text{OPA-}N)*100=M_w$$

In a more preferred embodiment, the at least one sugar is a reducing sugar. The reducing sugar is selected from the group consisting of monosaccharides, disaccharides and polysaccharides.

In yet another preferred embodiment, the monosaccharide is selected from the group consisting of xylose, glucose, ribose, arabinose, galactose, fructose and mannose; more preferably the at least one monosaccharide is glucose.

In yet another preferred embodiment, the disaccharide is selected from the group consisting of lactose and maltose. In yet another preferred embodiment, the polysaccharide is selected from the group consisting of dextrin, dextran, mannan, galactomannan, pullulan, xanthan gum, carrageenan, locust bean gum, tamarind seed gum, guar gum, galactooligosaccharide, monooligosaccharide, xylooligosaccharide, pectin, chitin, chitosan, and alginic acid.

In an embodiment, the at least one sugar has a weight average molecular weight ($M_W$) in the range of ≥100 to ≤20000 Da, preferably ≥100 to ≤10000 Da, more preferably ≥100 to ≤2000 Da, even more preferably ≥100 to ≤1000 Da.

Molecular Weight Determination of Sugar:

In an embodiment, the molecular weight of the monosaccharide or disaccharide is determined by methods known in the art.

In an embodiment, the molecular weight of the polysaccharide is determined by chromatographic techniques (Gel permeation chromatography, High performance chromatography).

In an embodiment, the at least one sugar is a monosaccharide or a disaccharide.

In a preferred embodiment, the composition comprises a) at least one protein hydrolysate or at least one protein hydrolysate conjugate; and b) at least one acid and its salts thereof;

wherein the at least one protein hydrolysate conjugate is obtained by amino-carbonyl bonding of an at least one protein hydrolysate with a weight average molecular weight (MW) in the range of ≥600 to ≤2400 Da and at least one monosaccharide and/or at least one disaccharide.

In a more preferred embodiment, the composition comprises a) at least one protein hydrolysate conjugate; and b) at least one acid and its salts thereof;

wherein the at least one protein hydrolysate conjugate is obtained by amino-carbonyl bonding of an at least one protein hydrolysate with a weight average molecular weight (MW) in the range of ≥600 to ≤2400 Da and at least one monosaccharide and/or at least one disaccharide.

In an even more preferred embodiment, the composition comprises a) at least one protein hydrolysate conjugate; and fb) lactic acid;

wherein the at least one protein hydrolysate conjugate is obtained by amino-carbonyl bonding of an at least one casein hydrolysate with a weight average molecular weight (MW) in the range of ≥600 to ≤2400 Da and at least one monosaccharide and/or at least one disaccharide.

In yet another preferred embodiment, the molar ratio of the at least one sugar to the at least one protein hydrolysate is in the range of ≥0.5:1.0 to ≤2.0:1.0.

In a preferred embodiment, the at least one protein hydrolysate is conjugated with at least one reducing sugar. An advantage of this conjugation is the reduction of a bitter taste of some protein hydrolysates without influencing or reducing the baking performance of the hydrolysates. Conjugation in the context of this application means more than just mixing hydrolysate and sugar but performing a Maillard reaction at elevated temperature. The conjugation is initiated by a condensation of amino groups of the protein hydrolysate with the carbonyl groups on the reducing sugar, resulting in Schiff base formation and rearrangement to Amadori and Heyns products. The conjugation can be performed in solutions/dispersions or in dry state and is preferably performed in solution with high concentration of peptides and sugars with reducing end. The hydrolysates treated by this conjugation are called "conjugated hydrolysates". The process of conjugation is controlled by selecting, e.g. pH, temperature and reaction time depending on the respective protein hydrolysate and its $M_W$. Higher amount of sugar results in less bitterness and higher pH results in less bitterness as well as longer reaction time further reduces bitterness. Preferably, the temperature is about 65° C. as higher temperatures need very accurate control of the process to avoid changes in color of the conjugate which are not desired for some applications where a white powder is preferred. The level of conjugation is characterized by determining the degree of conjugation.

In a preferred embodiment, the degree of conjugation, measured according to the method explained below, is in the range of ≥10.0% to ≤45.0%; more preferably ≥15.0% to ≤40.0%. It is to be understood that the higher the amount of sugar is, the lower is the bitterness of the conjugated hydrolysate, as more bitter taste causing groups can react with the reducing sugar. Therefore, the amount of sugar is higher for more bitter hydrolysates such as casein hydrolysate than for less bitter peptides such as wheat protein hydrolysate and will be adjusted depending of the individual bitterness.

In a preferred embodiment, the composition that is used according to the presently claimed invention is free of isolated emulsifiers selected form the group consisting of Lecithin (E322); Polysorbates (E432-436); Ammonium phosphatides (E442); Sodium, potassium and calcium salts of fatty acids (E470); Mono- and diglycerides of fatty acids (E471); Acetic acid ester of mono and diglycerides (E472a); Lactic acid ester of mono and diglycerides (E472b); Citric acid ester of mono and diglycerides (E472c); Diacetyl tartaric acid esters of mono- and diglycerides (E472e); sucrose esters of fatty acids (E473); sucroglycerides (E474); Propylene Glycol Esters of Fatty Acids (E477); Polyglycerol ester of fatty acid (E475); polyglycerol ester of castor oil fatty acids (E476); thermally oxidized soya bean oil interacted with mono- and diglycerides of fatty acids (E479) and sodium and calcium stearyl lactylate (E481 and E482) as all these emulsifiers have to be listed with their E number on a product label. Isolated emulsifiers in the context of this application mean emulsifiers prepared and added as a separate component to the batter and not as a naturally occurring part of an ingredient such as e.g. lecithin present in egg yolk.

In another preferred embodiment, the composition that is used according to the presently claimed invention is free of baking powder.

Use, Method and Composition

In one embodiment, the presently claimed invention provides a method for aerating a carbohydrate containing food product comprising the step of adding at least one composition comprising at least one protein hydrolysate or at least one protein hydrolysate conjugate and at least one acid and its salts thereof to the carbohydrate containing food product prior to aerating. In a more preferred embodiment, the presently claimed method for aerating a carbohydrate containing food product is performed for the preparation of baked goods.

In a preferred embodiment, the presently claimed invention provides a use of a composition comprising at least one protein hydrolysate or at least one protein hydrolysate conjugate and at least one acid and its salts thereof in baked goods.

In a preferred embodiment, the presently claimed invention provides a use of the composition comprising at least one protein hydrolysate conjugate; and at least one acid and its salts thereof, in baked goods.

In a preferred embodiment, the presently claimed invention provides a use of the composition comprising at least one protein hydrolysate conjugate; and lactic acid and its salts thereof, in baked goods.

The amount of the at least one protein hydrolysate or the at least one protein hydrolysate conjugate for the use or method according to the presently claimed invention is depending on the content of flour in the batter.

In a preferred embodiment, the molar ratio of the acid and its salts thereof to the at least one protein hydrolysate conjugate is in the range of ≥0.3:1.0 to ≤10:1.0.

In a preferred embodiment, the molar ratio of the acid and its salts thereof to the at least one protein hydrolysate is in the range of ≥0.3:1.0 to ≤10:1.0.

The quality of the composition having at least one protein hydrolysate or at least one protein hydrolysate conjugate and at least one acid to create a fine and stable foam is determined by the batter density. The lower batter density means, the batter is comprising more air bubbles and the final cake volume will be higher, if there is also sufficient stabilization during baking. In a preferred embodiment, the batter density of a standard cake recipe including the composition comprising the at least one protein hydrolysate or the at least one protein hydrolysate conjugate and at least one acid and its salts thereof after whipping and before baking is ≤320 g/L; more preferably ≤300 g/L. The whipping is performed according to example part "Whipping".

In a preferred embodiment, for an only starch comprising batter the amount of protein hydrolysate or the at least one protein hydrolysate conjugate, in the batter is in the range of ≥0.8% (w/w) to ≤10.0% (w/w). The optimal dosing depends on the individual protein hydrolysate or the protein hydrolysate conjugate, the batter variation and additional ingredients each baker makes.

In a preferred embodiment, for an only starch comprising batter the amount of casein hydrolysate or casein hydrolysate conjugate in the batter is 4.0% (w/w); more preferably 3.0% (w/w); in particular 2.5% (w/w).

In yet another preferred embodiment, the maximum amount of wheat protein hydrolysate or wheat protein hydrolysate conjugate in the batter is 7.0% (w/w); more preferably 6.0% (w/w), in particular 5.0% (w/w).

In a preferred embodiment, the presently claimed invention provides a method for aerating a carbohydrate containing food product comprising the step of adding the composition comprising at least one protein hydrolysate or at least one protein hydrolysate conjugate and at least one acid and its salts thereof to the carbohydrate containing food product prior to aerating, wherein the carbohydrate containing food product is free of isolated emulsifiers selected form the group consisting of Lecithin (E322); Polysorbates (E432-436); Ammonium phosphatides (E442); Sodium, potassium and calcium salts of fatty acids (E470); Mono- and diglycerides of fatty acids (E471); Acetic acid ester of mono and diglycerides (E472a); Lactic acid ester of mono and diglycerides (E472b); Citric acid ester of mono and diglycerides (E472c); Diacetyl tartaric acid esters of mono- and diglycerides (E472e); sucrose esters of fatty acids (E473); sucroglycerides (E474); Propylene Glycol Esters of Fatty Acids (E477); Polyglycerol ester of fatty acid (E475); polyglycerol ester of castor oil fatty acids (E476); thermally oxidized soya bean oil interacted with mono- and diglycerides of fatty acids (E479) and sodium and calcium stearyl lactylate (E481 and E482) as all these emulsifiers have to be listed with their E number on a product label. Isolated emulsifiers in the context of this application mean emulsifiers prepared and added as a separate component to the batter and not as a naturally occurring part of an ingredient such as e.g. lecithin present in egg yolk.

In a preferred embodiment, the presently claimed invention provides a method for aerating a carbohydrate containing food product comprising the step of adding at least one composition comprising at least one protein hydrolysate or at least one protein hydrolysate conjugate and at least one acid and its salts thereof to the carbohydrate containing food product prior to aerating, wherein the carbohydrate containing food product is free of baking powder.

In a preferred embodiment, the volume of a standard cake comprising the composition comprising at least one protein hydrolysate or at least one protein hydrolysate conjugate and at least one acid and its salts thereof, which is a cake baked of 500 g to 550 g batter according to the flour/starch or starch recipe, is 3000 mL to 3300 mL flour. The volume after baking is an important quality parameter together with the crumb structure of the cake. The volume can be determined by various methods such as laser scanning or rapeseed displacement method. A sponge cake is expected to be light and having an even structure. High volumes often result in big air pockets and an irregular structure.

In a preferred embodiment, the composition comprising at least one protein hydrolysate or at least one protein hydrolysate conjugate and at least one acid and its salts thereof is used as a lyophilized or spray dried powder. It is also possible to apply the composition as a liquid or concentrate directly after hydrolysis, but protein liquids are generally more difficult to stabilize and to preserve than dried powders, especially for food applications.

Process

In one embodiment, the presently claimed invention provides a process for the preparation of a composition comprising at least one protein hydrolysate conjugate and at least one acid and its salts thereof, which comprises at least the steps of:

i) contacting at least one acid and its salts thereof with protein hydrolysate conjugate to adjust a pH in the range of ≥4.5 to ≤6.5 to obtain a mixture; and
ii) a processing step selected from the group consisting of spray drying, pasteurization and lyophilization of the mixture.

In a preferred embodiment, the protein hydrolysate conjugate is obtained by amino-carbonyl bonding of an at least one protein hydrolysate with a weight average molecular weight ($M_W$) in the range of ≥600 to ≤2400 Da and an at least one sugar having a weight average molecular weight ($M_W$) in the range of ≥100 to ≤20000 Da.

In yet another preferred embodiment, the at least one acid is selected from the group consisting of lactic acid, phosphoric acid, hydrochloric acid, citric acid, ascorbic acid, tartaric acid and sulfuric acid; more preferably the at least one acid is lactic acid.

In a more preferred embodiment, the at least one acid and its salts thereof are present in a solid form or in the form of a solution, preferably an aqueous solution. In yet another preferred embodiment, the lactic acid and its salts thereof are present in the form of a solution.

In yet another preferred embodiment, the pH in step i) is in the range of ≥5.0 to ≤6.0.

In an embodiment, the presently claimed process further comprises at least one processing step selected from the group consisting of spray drying, pasteurization and lyophilization of the mixture; more preferably spray drying and lyophilization.

In the following, there is provided a list of embodiments to further illustrate the present disclosure without intending to limit the disclosure to the specific embodiments listed below.

1. Use of a composition comprising
   a) at least one protein hydrolysate or at least one protein hydrolysate conjugate; and
   b) at least one acid and its salts thereof;
   as whipping agent.
2. A method for aerating a carbohydrate containing food product comprising the step of adding at least one composition comprising at least one protein hydrolysate or at least one protein hydrolysate conjugate and at least one acid and its salts thereof to the carbohydrate containing food product prior to aerating.

3. The use or method according to embodiment 1 or 2, wherein the at least one acid is selected from the group consisting of lactic acid, phosphoric acid, hydrochloric acid, citric acid, ascorbic acid, tartaric acid and sulfuric acid.
4. The use or method according to any one of the preceding embodiments, wherein the at least one acid is lactic acid.
5. The use or method according to any one of the preceding embodiments, wherein the at least one protein hydrolysate conjugate is obtained by amino-carbonyl bonding of an at least one protein hydrolysate with a molecular weight ($M_W$) in the range of ≥600 to ≤2400 Da and an at least one sugar having a molecular weight ($M_W$) in the range of ≥100 to ≤20000 Da.
6. The use or method according to any one of the preceding embodiments, wherein the at least one protein hydrolysate is a plant or animal protein hydrolysate.
7. The use or method according to any one of the preceding embodiments, wherein the at least one protein hydrolysate is selected from the group consisting of wheat, soy, rice, potato, pea, sunflower, rape seed, lupin and milk protein hydrolysate.
8. The use or method according to embodiment 7, wherein the at least one milk protein hydrolysate is selected from the group consisting of casein, whey protein and beta-lactoglobulin hydrolysate.
9. The use or method according to any one of the embodiments 6 to 8, wherein the at least one protein hydrolysate is selected from the group consisting of wheat hydrolysate and casein hydrolysate.
10. The use or method according to any one of the preceding embodiments, wherein the at least one protein hydrolysate is an enzymatically hydrolysed protein hydrolysate.
11. The use or method according to embodiment 10, wherein the enzymatically hydrolysed protein hydrolysate is obtained by hydrolysis of the protein by at least one endopeptidase.
12. The use or method according to embodiment 11, wherein the at least one endopeptidase is selected from the group consisting of Alkalase and Neutrase.
13. The use or method according to embodiment 1 or 2, wherein the at least one protein hydrolysate is a chemically hydrolysed protein hydrolysate.
14. The use or method according to embodiment 13, wherein the chemically hydrolysed protein hydrolysate is obtained by hydrolysis of a protein by an acid or an alkali hydroxide.
15. The use or method according to embodiment 14, wherein the alkali hydroxide is selected from the group consisting of sodium hydroxide and potassium hydroxide.
16. The use or method according to embodiment 5, wherein the at least one sugar is a reducing sugar.
17. The use or method according to embodiment 16, wherein the reducing sugar is selected from the group consisting of monosaccharides, disaccharides and polysaccharides.
18. The use or method according to embodiment 17, wherein the monosaccharide is selected from the group consisting of xylose, glucose, ribose, arabinose, galactose, fructose and mannose.
19. The use or method according to embodiment 17 or 18, wherein the monosaccharide is glucose.
20. The use or method according to embodiment 17, wherein the disaccharide is selected from the group consisting of lactose and maltose.
21. The use or method according to embodiment 17, wherein the polysaccharide is selected from the group consisting of dextrin, dextran, mannan, galactomannan, pullulan, xanthan gum, carrageenan, locust bean gum, tamarind seed gum, guar gum, galactooligosaccharide, monooligosaccharide, xylooligosaccharide, pectin, chitin, chitosan, and alginic acid.
22. The use or method according to embodiment 5, wherein the amino-carbonyl bonding is performed by a Maillard reaction.
23. The use or method according to any one of the embodiments 5 or 22, wherein the amino-carbonyl bonding is performed at a temperature in the range of ≥40° C. to ≤75° C.
24. The use or method according to any one of the preceding embodiments, wherein the molar ratio of the at least one sugar to the at least one protein hydrolysate is in the range of ≥0.5:1.0 to ≤2.0:1.0.
25. The use or method according to any one of the preceding embodiments, wherein the degree of conjugation is in the range of ≥10.0% to ≤45.0%.
26. The use or method according to any one of the preceding embodiments, wherein the molar ratio of the acid and its salts thereof to the at least one protein hydrolysate conjugate is in the range of ≥0.3:1.0 to ≤10:1.0.
27. The use or method according to any one of the preceding embodiments, wherein the molar ratio of lactic acid and its salts thereof to the at least one protein hydrolysate is in the range of ≥0.3:1.0 to ≤10:1.0.
28. The use or method according to any one of the embodiments 1 to 28, wherein the composition is free of baking powder.
29. The use of a composition as defined in any one of the preceding embodiments for the preparation of baked goods.
30. A composition comprising
    A) at least one protein hydrolysate conjugate; and
    B) at least one acid and its salts thereof.
31. The composition according to embodiment 30, wherein the composition is free of baking powder.
32. The composition according to embodiment 30 or 31, wherein the at least one protein hydrolysate conjugate is obtained by amino-carbonyl bonding of an at least one protein hydrolysate with a molecular weight ($M_W$) in the range of ≥600 to ≤2400 Da and an at least one sugar having a molecular weight ($M_W$) in the range of ≥100 to ≤20000 Da.
33. The composition according to embodiment 30 or 31, wherein the at least one protein hydrolysate is an enzymatically hydrolysed protein hydrolysate.
34. The composition according to embodiment 30, wherein the molar ratio of the at least one acid to the at least one protein hydrolysate conjugate is in the range of ≥0.5:1.0 to ≤2.0:1.0.
35. A process for the preparation of the composition according to any of the embodiments 30 to 34, which comprises at least the steps of:
    i) contacting at least one acid and its salts thereof with protein hydrolysate conjugate to adjust a pH in the range of ≥4.5 to ≤6.5 to obtain a mixture; and ii) a processing step selected from the group consisting of spray drying, pasteurization and lyophilization of the mixture.

36. The process according to embodiment 35, wherein the at least one acid is selected from the group consisting of lactic acid, phosphoric acid, hydrochloric acid, citric acid and sulfuric acid.

37. The process according to the embodiment 35, wherein in step i) the pH is in the ≥5.0 to ≤6.0 to obtain a mixture.

38. The process according to embodiment 35, wherein the at least one acid and its salts thereof are present in a solid form or in the form of a solution.

39. The process according to any one of the embodiments 35 to 38, wherein the at least one acid is lactic acid which is present in the form of a solution.

40. The process according to any one of the embodiments 35 to 39, wherein the protein hydrolysate conjugate is obtained by amino-carbonyl bonding of an at least one protein hydrolysate with a molecular weight ($M_W$) in the range of ≥600 to ≤2400 Da and an at least one sugar having a molecular weight ($M_W$) in the range of ≥100 to ≤20000 Da.

While the presently claimed invention has been described in terms of its specific embodiments, certain modifications and equivalents will be apparent to those skilled in the art and are intended to be included within the scope of the presently claimed invention.

EXAMPLES

The presently claimed invention is illustrated in detail by non-restrictive working examples which follow. More particularly, the test methods specified hereinafter are part of the general disclosure of the application and are not restricted to the specific working examples.

Analytical Equipment:

Hobart N 50 planetary mixer having three speed settings, step 1, 2, and 3

Winkler deck oven

Stable Micro Systems Texture Analyzer

Volscan, Micro Stable Systems.

Solubility

Solubility of the protein hydrolysate is determined for the protein hydrolysate powders after spray drying by dispersing 5 g protein hydrolysate powder in 92.5 g tap water with 2.5 g Clarcel DIC-B as filtration aide at 25° C. Care must be taken that the protein hydrolysate powder does not form clumps, when it is dispensed into the water, by adding it slowly to the water phase. The dispersion is then adjusted to pH 8±0.5 using NaOH or HCl. The dispersion/solution is stirred with a magnetic stirrer at 200 rpm for 1 hour. The sample is filtered under pressure at 2.5 bars using Seitz K 300 R001/4 cm filter paper. Protein concentration was measured before filtration and in the filtrate. Solubility was calculated by the following formula:

(g protein in filtrate/g protein before filtration) *100=% solubility of protein hydrolysate.

Protein Concentration (Dumas)

The protein concentration is analyzed per an ISO standard method (ISO 16634). Samples are converted to gases by heating in a combustion tube which gasifies samples. Interfering components are removed from the resulting gas mixture. The nitrogen compounds in the gas mixture or a representative part of them are converted to molecular nitrogen, which is quantitatively determined by a thermal conductivity detector. The nitrogen content is calculated by a microprocessor. To estimate the protein content based on nitrogen the following factors where used: Wheat protein, 5.7; casein and soy 6.25; rice 5.95.

Weight Average Molecular Weight

A weight average molecular weight $M_W$ value was determined by measuring OPA-N (Frister H., Meisel H., Schlimme E. (1988) OPA method modified by use of N,N-dimethyl-2-mer captoethylammonium chloride as thiol component. Anal. Chem. V 330, pp 631-633). OPA-N does not give a direct indication of MW but only the amount of end amine groups per sample. A $M_W$ measurement needs to be done prior to the conjugation. An $M_W$ value can be gotten by dividing the total amount of nitrogen (total amount of Nitrogen is measured with the Dumas method 1826 described above) found with the OPA-N value using the following formula:

$$(\text{Total } N/\text{OPA-}N)*100=M_W$$

Mono- and Diglyceride/Sugar

Method to quantify Mono- and diglyceride see Morrison, W. R. Mann, D. L. Soon, W. Conventry A. M. (1975). Selective extraction and quantitative analysis of non-starch and starch lipids from wheat flour. Journal of the science of food and agriculture, v. 26 (4), pp 507-521.

Degree of Conjugation is Determined as Follows

First OPA-N value is divided by the total amount of nitrogen i.e. free amino group divided by total amount of nitrogen from all amino acids. Then calculate the % reduction of this ratio after conjugation.

$$\text{Degree of conjugation}=[(\text{OPA-}N_{start}/\text{Nitrogen}_{start})-(\text{OPA-}N_{end}/\text{Nitrogen}_{end})]/(\text{OPA-}N_{start}/\text{Nitrogen}_{start})$$

$\text{OPA-N}_{start}$ is the OPA-N value of hydrolysed protein without conjugation reaction and $\text{OPA-N}_{end}$ is the OPA-N value after conjugation reaction. Similarly, $\text{Nitrogen}_{start}$ is the total nitrogen content of the hydrolysed protein without conjugation reaction while $\text{Nitrogen}_{end}$ is the total nitrogen content after conjugation reaction. The ratios are used to account for the dilution effect which occurs when sugar is added to the system therefore both total nitrogen and OPA-N is directly reduced by the dilution. However, by using the ratios only the absolute reduction in free amino groups are calculated.

Hardness and Elasticity Determination of Baked Goods

Hardness and Elasticity of the baked goods was determined by texture profile analyses (TPA) (TA-XT2i, Stable Micro Systems, Surrey GU7 1YL United Kingdom)) which was done with a texture analyzer.

1. General Method for the Preparation of Protein Hydrolysate

Proteins were dispersed in water followed by pH adjustment. The pH was adjusted to the optimal pH range for each enzyme and can thus vary depending on which enzyme was used. The common processing temperature was 50-65° C. When temperature and pH conditions of the protein dispersion were stable, the enzyme was added to start the protein hydrolysis reaction. The reaction time dictates the MW of the protein hydrolysate that was produced thus protein hydrolysate properties can be controlled by the reaction time. When the desired MW was achieved, the reaction was stopped by either increasing temperature to denature the enzyme or by changing pH. Common denaturation temperatures are 80-90° C., depending on the type of enzyme used. After denaturation, the protein hydrolysate was lyophilized using, but not limited to, spray drying or freeze drying.

1.2 General Method for the Preparation of Protein Hydrolysate Conjugate

The protein hydrolysate was dissolved in water, the sugar was added to the solution at 65-85° C. and pH was adjusted to 8 or 8.5 with NaOH. The system was stirred while pH was kept constant using NaOH. After 30 or 60 minutes the system was spray dried to form powder.

2. Preparation of Composition of Casein Hydrolysate Conjugate and Lactic Acid

Water (21.5 kg) was heated to 55-65° C. (temperature was kept during the whole hydrolysis time) and NaOH (20% NaOH solution, 0-250 g) was added to it. Casein (6-8 kg) (molecular weight approx. 20 KDa) was added into the warm water and the pH was adjusted to 8.5-9.5 using 20% NaOH solution. Alcalase (40-100 g) was added to it and the material was stirred for 15-60 minutes while slowly adding 5-12 kg of casein (pH was kept at 8.5-9.5). Alcalase (40-100 g) was added and pH was kept constant at pH 8.0-9.0 for 10-120 minutes using 20% NaOH solution. Optionally 5-7 kg of casein was added while keeping pH at 8.0-9.0 for 30-120 minutes. The mixture was stirred for 30-120 minutes while the pH was not kept constant. The end pH was 7.5-8.5. The enzymatic reaction was stopped by heating to 80-84° C., and the temperature was kept constant for 15 minutes. The weight average molecular weight of the casein hydrolysate was between 600 and 750 Da.

The mixture was cooled to 65° C. and 8-12 kg of dextrose (Mw—180 g/mol) was added to the solution then NaOH (20% NaOH solution) was used to adjust the pH to 8.5-9.0 and the pH was kept for 1 h. The weight average molecular weight of the casein hydrolysate conjugate was between 720 and 870 Da. Lactic acid (88-90% solution) was added to it and pH was adjusted to 5.5. The mixture was spray dried to form a powder.

3. Whipping

The baking performance of a protein hydrolysate was tested in a standard cake application (Table 1). A blend of 36.8 g wheat flour, 147.2 g native wheat starch, 150 g sugar, 1 g sodium chloride and either, 230 g whole egg, 30 g egg white and 30 g water or 250 g whole egg and 50 g was whipped up together with the protein hydrolysate in a planetary mixer (Hobart N 50, Dayton, Ohio, USA) for 5 minutes at step 3 and additional 30 seconds at step 2.

TABLE 1

| Sponge cake recipes | | |
|---|---|---|
| Ingredients | recipe I | recipe II |
| Wheat flour | 36.8 | 36.8 |
| Wheat starch | 147.2 | 147.2 |
| Sugar | 150.0 | 150.0 |
| Salt | 1.0 | 1.0 |
| Whole egg | 230.0 | 250.0 |
| Egg white | 30.0 | — |
| Water | 20.0 | 50.0 |

3.1 Batter Density

After whipping, the batter density was determined by weighing the amount (g) of batter that fills a 250 mL bowl. The weight was multiplied with four to achieve a batter density in gram per liter.

Example: 100 g batter in 250 mL bowl*4=batter density of 400 g/L 3.2 Baking and Standard Cake Volume 550 g batter was weighed into a round baking tin (26 cm diameter, 5 cm high) and baked at 195° C. for approx. 29 minutes in deck oven (Wachtel, Hilden, Germany) with opened draft. The volume of the standard cake was determined by using a laser scanner (Volscan 600 VSP6000152 Stable Micro Systems, Surrey GU7 1YL United Kingdom).

3.3 Cake Structure Evaluation

Cake structure evaluation was performed by letting the cake cool down to room temperature (store at room temperature for 1 hour) then the cake was cut horizontally in the middle to investigate the cake structure. The cake structure was evaluated haptically and visually by skilled master bakers or lab technicians.

Figure 2:
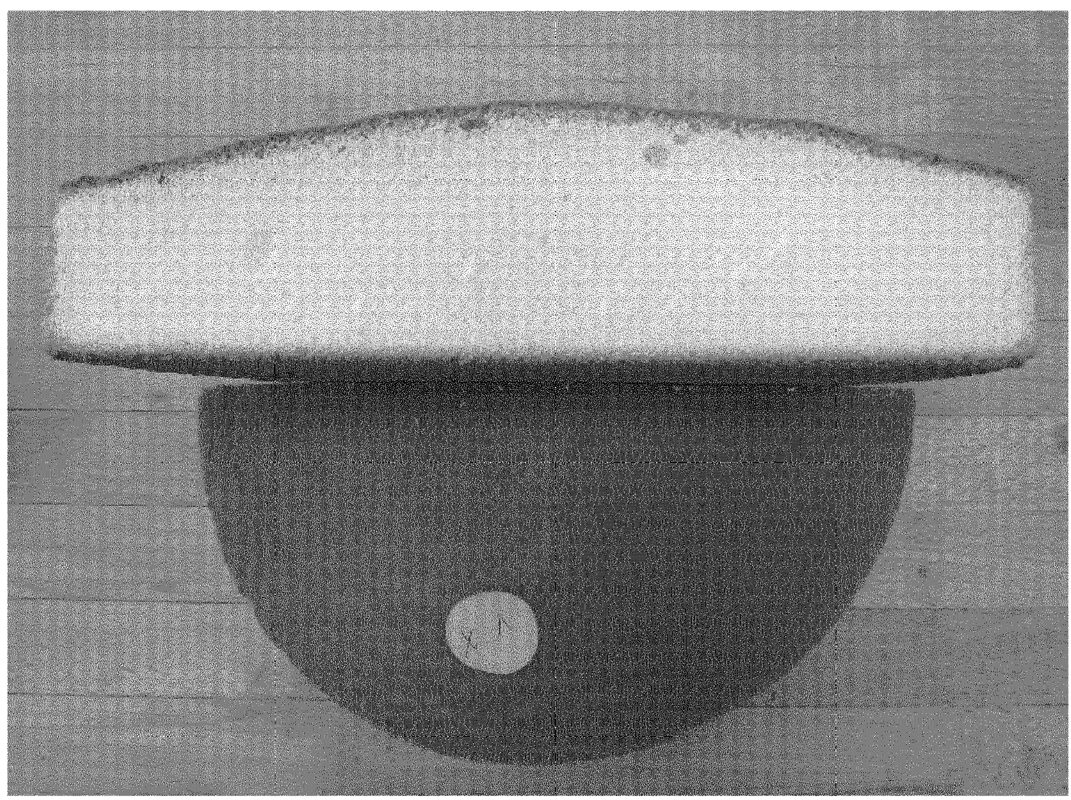
FIG. 2 shows a cake made with recipe 2, which includes the improved whipping agent described herein.
Figure 3:
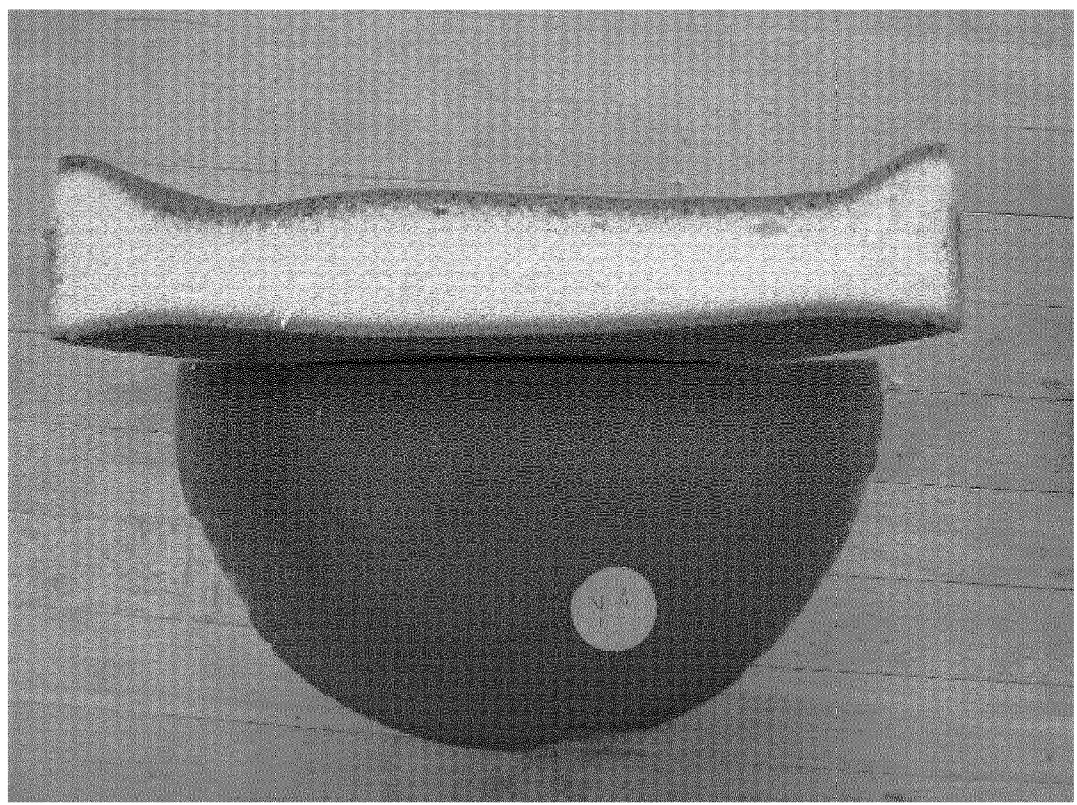
FIG. 3 shows a cake make with recipe 3, for comparative purposes. This cake was not made with the improved whipping agent described herein, and is shown for comparative purposes.
Figure 4:
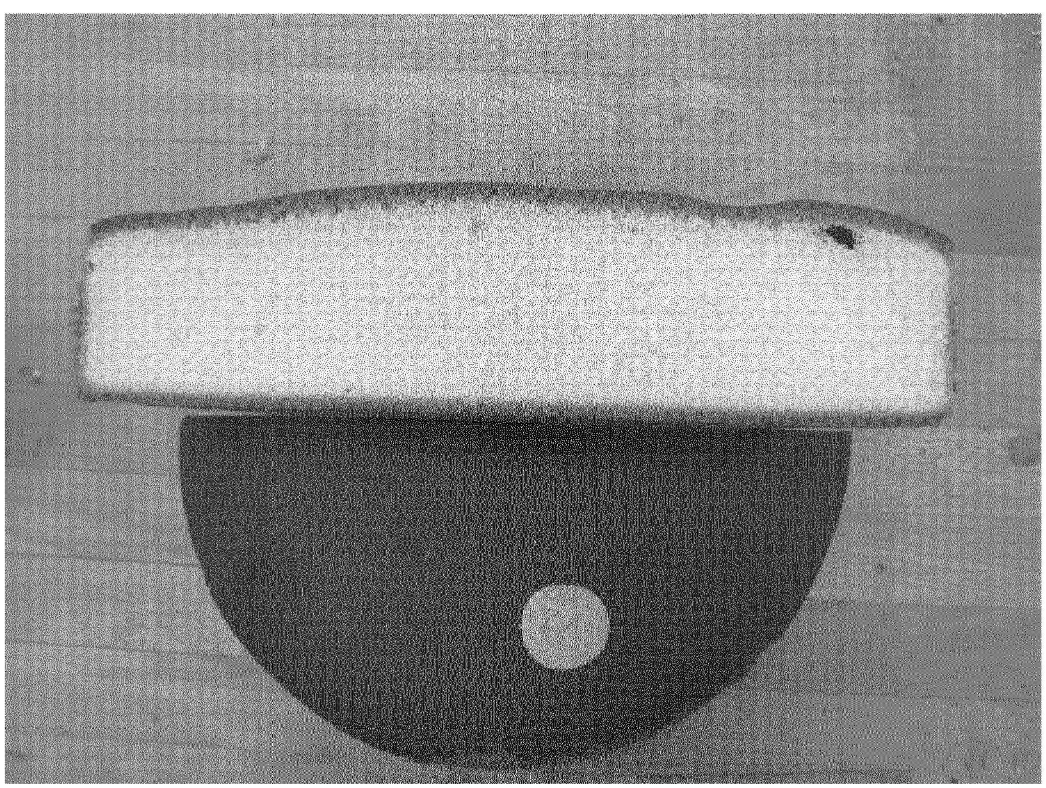
FIG. 4 shown a cake made with recipe 4, which includes the improved whipping agent described herein.
Figure 5:
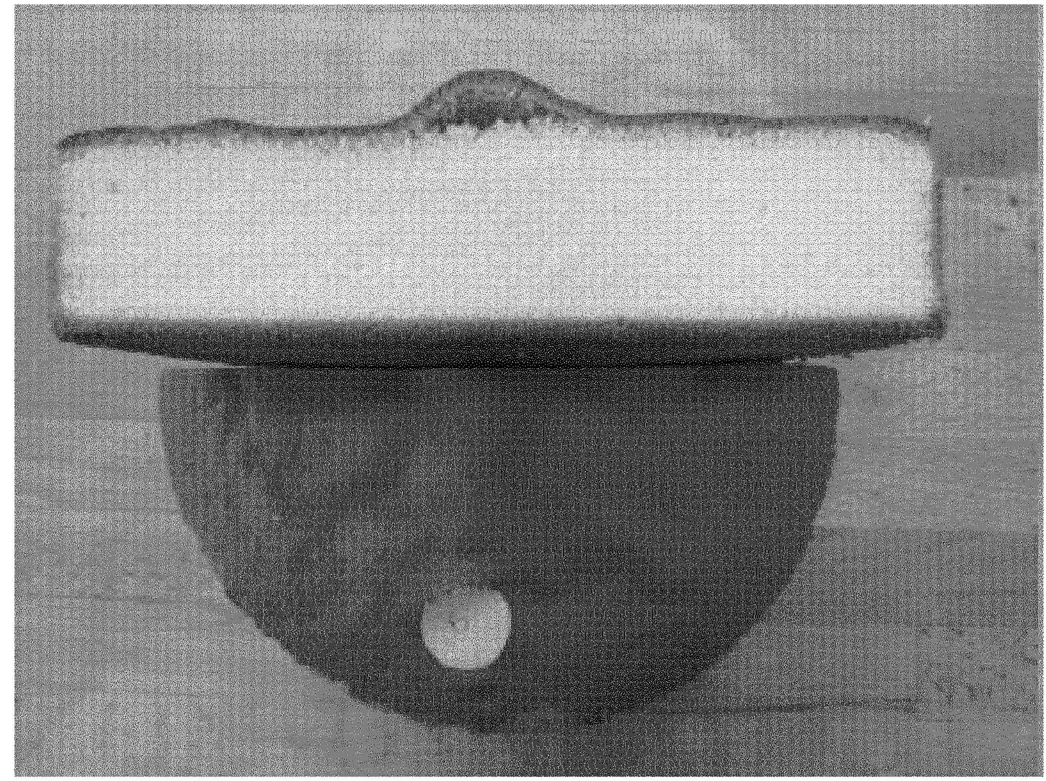
FIG. 5 shows a cake made with recipe 5, which includes the improved whipping agent described herein.
Figure 6:
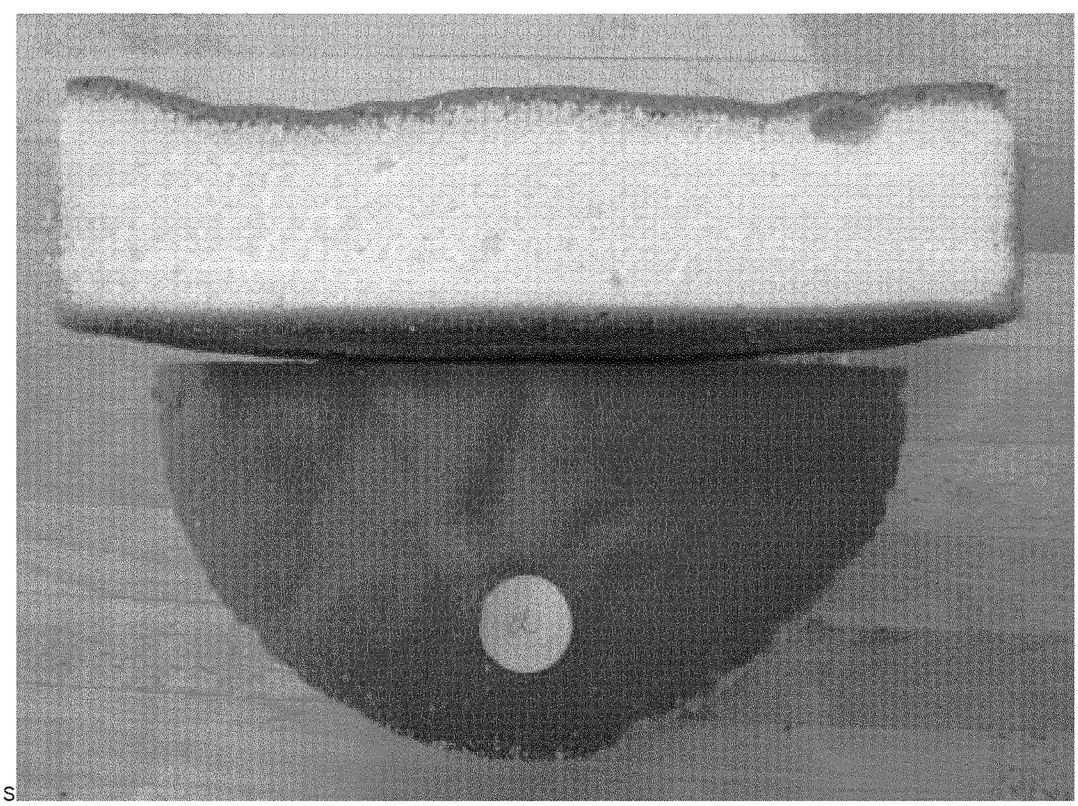
FIG. 6 shows a cake made with recipe 6, which includes the improved whipping agent described herein.

4. The cake recipes 2 (FIG. 2) and recipe 4 (FIG. 4), recipe 5 (FIG. 5), recipe 6 (FIG. 6) are according to the invention and recipes 1 (FIG. 1) and 3 (FIG. 3) are not according to the invention (comparative).

The recipes 1-6 were tested and the texture profile analysis (IRA) was performed on parameters of hardness and elasticity for recipes 1-6.

TABLE 2

| Ingredients | recipe 1* | recipe 2 | recipe 3* | recipe 4 | recipe 5 | recipe 6 |
|---|---|---|---|---|---|---|
| Wheat flour | 36.8 | 36.8 | 36.8 | 36.8 | 36.8 | 36.8 |
| Wheat starch | 147.2 | 147.2 | 147.2 | 147.2 | 147.2 | 147.2 |
| Sugar | 150.0 | 150.0 | 150.0 | 150.0 | 150.0 | 150.0 |
| Salt | 1.0 | 1.0 | 1.0 | 1.0 | 1.0 | 1.0 |
| Casein hydrolysate conjugate | — | — | 18.0 | 18.0 | 18.0 | 18.0 |
| Casein hydrolysate | 10.0 | 10.0 | — | — | — | — |
| Lactic acid | — | 0.9 | — | 0.9 | — | — |
| Citric acid | — | — | — | — | 0.9 | — |
| Acetic acid | — | — | — | — | — | 0.9 |
| Whole egg | 250.0 | 250.0 | 250.0 | 250.0 | 250.0 | 250.0 |
| Egg white | — | — | — | — | — | — |
| Water | 50.0 | 50.0 | 50.0 | 50.0 | 50.0 | 50.0 |
| Batter density (g/L) | 290 | 280 | 300 | 290 | 256 | 224 |
| Hardness (g) | 590 | 380 | 550 | 350 | 311 | 324 |
| Elasticity | 1.0 | 2.0 | 1.0 | 2.25 | — | — |

*out of scope

The following observations were made on addition of lactic acid in the recipes 2 and 4:

- stabilized consistency of batter and lower batter density.
- improvement of cake volume and thus crumbs hardness was reduced.
- cakes showed higher elasticity.

The invention claimed is:

1. A method for aerating a carbohydrate containing food product comprising the step of adding at least one composition comprising at least one protein hydrolysate conjugate and at least one acid or a salt thereof to the carbohydrate containing food product prior to aerating;

wherein the at least one protein hydrolysate conjugate is obtained by amino-carbonyl bonding of at least one protein hydrolysate with a weight average molecular weight ($M_w$) in the range of ≥600 to ≤2400 Da and at least one sugar having a weight average molecular weight ($M_w$) in the range of ≥100 to ≤20000 Da; and wherein the molar ratio of the at least one acid and its salts thereof to the at least one protein hydrolysate conjugate is in the range of ≥0.3:1.0 to ≤10:1.0.

2. The method according to claim 1, wherein the at least one acid is selected from the group consisting of lactic acid, phosphoric acid, hydrochloric acid, citric acid, ascorbic acid, tartaric acid and sulfuric acid.

3. The method according to claim 1, wherein the at least one acid is lactic acid.

4. The method according to claim 1, wherein the at least one protein hydrolysate from which the protein hydrolysate conjugate is prepared is a plant or animal protein hydrolysate.

5. The method according to claim 1, wherein the at least one protein hydrolysate from which the protein hydrolysate conjugate is prepared is selected from the group consisting of wheat, soy, rice, potato, pea, sunflower, rape seed, lupin and milk protein hydrolysate.

6. The method according to claim 1, wherein the at least one protein hydrolysate from which the protein hydrolysate conjugate is prepared is an enzymatically hydrolyzed protein hydrolysate.

7. The method according to claim 1, wherein the at least one sugar is a reducing sugar.

8. The method according to claim 7, wherein the reducing sugar is selected from the group consisting of monosaccharides, disaccharides and polysaccharides.

9. The method according to claim 8, wherein the monosaccharide is selected from the group consisting of xylose, glucose, ribose, arabinose, galactose, fructose and mannose.

10. The method according to claim 1, wherein the at least one protein hydrolysate conjugate is obtained by amino-carbonyl bonding of an at least one protein hydrolysate with a weight average molecular weight ($M_w$) in the range of ≥750 to ≤1800 Da and at least one sugar having a weight molecular weight ($M_w$) in the range of ≥100 to ≤1000 Da.

11. The method according to claim 1, wherein the composition is free of baking powder.

12. A composition comprising a) at least one protein hydrolysate conjugate and as component b) lactic acid;

wherein the at least one protein hydrolysate conjugate is obtained by amino-carbonyl bonding of an at least one protein hydrolysate with a weight average molecular weight (Mw) in the range of ≥600 to ≤2400 Da and at least one sugar having a weight average molecular weight (Mw) in the range of ≥100 to ≤20000 Da; and wherein the molar ratio of lactic acid to the at least one protein hydrolysate conjugate is in the range of ≥0.3:1.0 to ≤10:1.0.

13. The composition according to claim 12, wherein the at least one sugar is a reducing sugar.

14. The composition according to claim 13, wherein the reducing sugar is selected from the group consisting of monosaccharides, disaccharides and polysaccharides.

15. The composition according to claim 13, wherein the reducing sugar is a monosaccharide and the monosaccharide is selected from the group consisting of xylose, glucose, ribose, arabinose, galactose, fructose and mannose.

16. The composition according to claim 12, wherein the at least one protein hydrolysate conjugate is obtained by amino-carbonyl bonding of an at least one protein hydrolysate with a weight average molecular weight ($M_w$) in the range of ≥750 to ≤1800 Da and at least one sugar having a weight molecular weight ($M_w$) in the range of ≥100 to ≤1000 Da.

* * * * *